US012718999B2

(12) United States Patent
Hintze et al.

(10) Patent No.: US 12,718,999 B2
(45) Date of Patent: Aug. 25, 2026

(54) SWITCH ARRANGEMENT AND METHOD FOR OPERATING A SWITCH ARRANGEMENT

(71) Applicant: Siemens Aktiengesellschaft, Munich (DE)

(72) Inventors: Thomas Hintze, Falkensee (DE); Martin Bindrich, Berlin (DE); Detlef Schwope, Berlin (DE); Malte Georg Hirte, Petershagen (DE); Mario Schäfer, Potsdam (DE); Stefan Lecheler, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 246 days.

(21) Appl. No.: 18/684,304

(22) PCT Filed: Jul. 12, 2022

(86) PCT No.: PCT/EP2022/069485
§ 371 (c)(1),
(2) Date: Feb. 16, 2024

(87) PCT Pub. No.: WO2023/020750
PCT Pub. Date: Feb. 23, 2023

(65) Prior Publication Data

US 2025/0149275 A1 May 8, 2025

(30) Foreign Application Priority Data

Aug. 16, 2021 (DE) .................... 10 2021 208 968.2

(51) Int. Cl.
*H01H 33/666* (2006.01)
*H01H 50/44* (2006.01)

(52) U.S. Cl.
CPC .......... *H01H 33/666* (2013.01); *H01H 50/44* (2013.01)

(58) Field of Classification Search
None
See application file for complete search history.

(56) References Cited

U.S. PATENT DOCUMENTS

| | | | | |
|---|---|---|---|---|
| 5,748,433 | A | 5/1998 | Schrey et al. | |
| 8,773,836 | B2 | 7/2014 | Lenz | |
| 2024/0006105 | A1 * | 1/2024 | Choi | H01F 7/1811 |

FOREIGN PATENT DOCUMENTS

| | | | |
|---|---|---|---|
| DE | 19526681 | A1 | 1/1997 |
| DE | 102012108618 | A1 | 3/2013 |

(Continued)

OTHER PUBLICATIONS

Machine translation of JP-5617759-B2 (Year: 2014).*

*Primary Examiner* — Bernard Rojas
(74) *Attorney, Agent, or Firm* — Laurence A. Greenberg; Werner H. Stemer; Ralph E. Locher

(57) ABSTRACT

A switch arrangement has a vacuum switch device with a movable contact and a fixed contact. A magnet drive with at least one coil is configured, in the connected state, to exert an attractive force on an armature and to move it. A transmission mechanism is configured to convert a movement of the armature into a movement of the movable contact towards the fixed contact. A polarity reversal device is configured to reverse the polarity of a current flow through the at least one coil. There is also described a corresponding method.

11 Claims, 1 Drawing Sheet

(56) References Cited

FOREIGN PATENT DOCUMENTS

| | | | | |
|---|---|---|---|---|
| EP | 1732097 | A2 | 12/2006 | |
| EP | 3432471 | A1 | 1/2019 | |
| EP | 2538429 | B1 | 10/2019 | |
| JP | 5617759 | B2 * | 11/2014 | ............ H01H 33/66 |

* cited by examiner

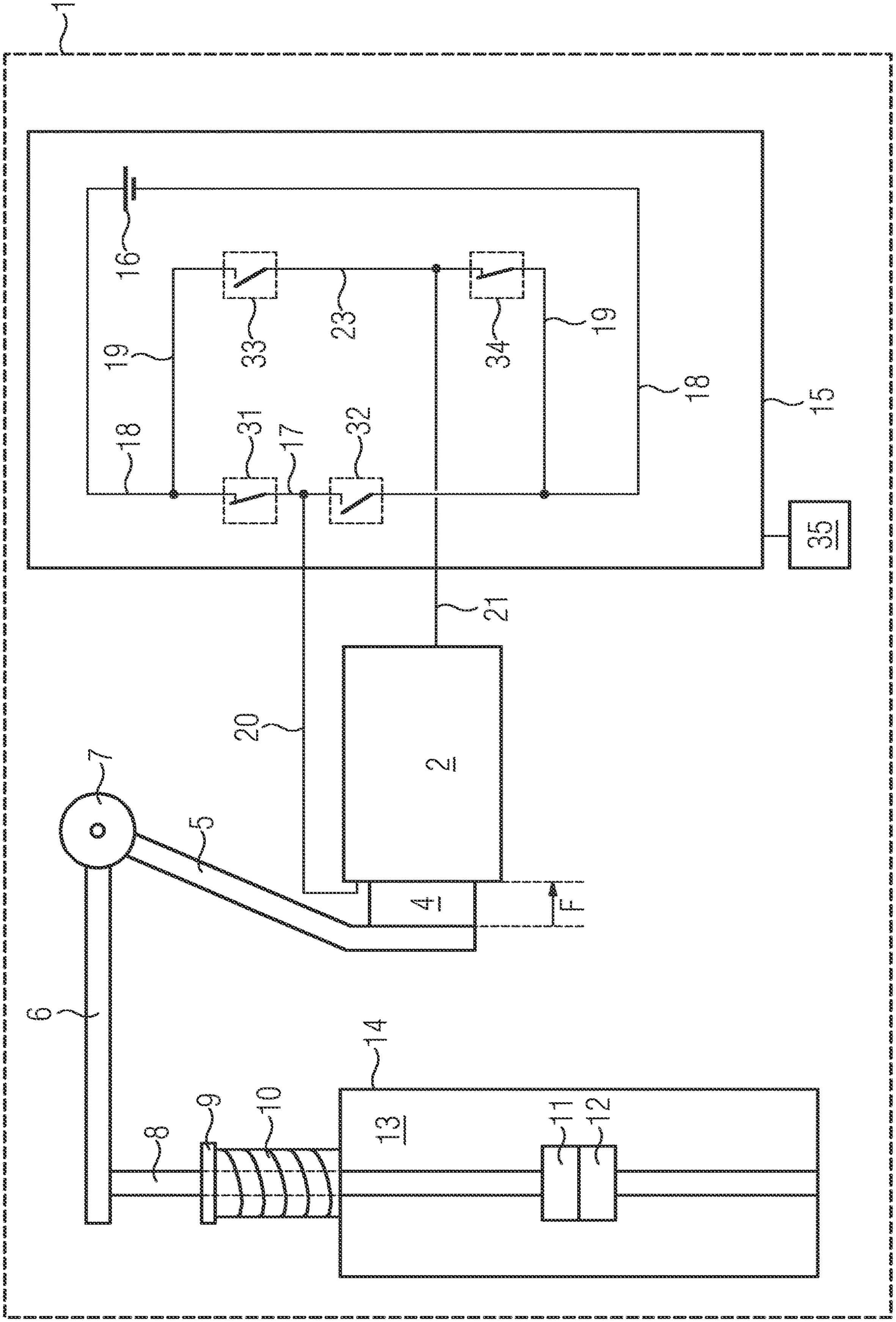
1
2
4
5
6
7
8
9
10
11
12
13
14
15
16
17
18
19
20
21
23
31
32
33
34
35
F

SWITCH ARRANGEMENT AND METHOD FOR OPERATING A SWITCH ARRANGEMENT

FIELD AND BACKGROUND OF THE INVENTION

The invention relates to a switching arrangement switching arrangement having a vacuum switching device with a movable contact and a fixed contact. A solenoid actuator has at least one coil, which is designed, in the on-state, to exert an attractive force on a magnet armature and to move same. A transmission mechanism which is designed to convert a movement of the magnet armature into a movement of the movable contact toward the fixed contact. The invention also relates to a method for operating a switching arrangement.

From the operating instructions "3TM Vacuum contactor 7.2 kV-15 kV, 3-pole, 4.15 kV-6.9 kV, 1-pole", order no.: 9229 0106 100 0, Siemens AG 2020, a switching device for medium voltage is known, which has a vacuum switching device having an electromagnetic operating mechanism. The solenoid actuator can in this case exert a magnetic force on what is known as an armature plate and attract same. The movement of the armature plate is mechanically converted into a movement for pressing the movable contact against the fixed contact inside the vacuum switching device. For this device, as for solenoid actuators of circuit breakers and contactors, two magnetic coils are often used, which must be wired either in parallel (e.g. for AC/DC in countries with 115 V mains voltage) or in series (e.g. for AC/DC in countries with 230 V mains voltage), depending on the level of the input voltage. In a further design, the contactor is designed for operation e.g. on a battery with an input voltage of DC: 24 V or DC: 48 V. The same coils are used here also, which are wired in parallel for an input voltage of DC: 24 V and in series for an input voltage of DC: 48 V.

In the on-state, the armature plate together with the iron core(s) of the magnetic coil(s) form a magnetic circuit. As the magnetic coil(s) are usually operated using direct current, the magnetic flux in the armature does not change during the on-time. This leads to a magnetization of the armature plate or the entire ferromagnetic circuit. A magnetized armature plate delays the switching off of the circuit breaker or contactor, as due to the remanence of the ferrous material used, the magnetic force remains even after the current through the magnetic coil(s) is switched off. The return springs must first overcome this residual magnetic force before the armature plate is released from the coil cores. Depending on the mechanical construction of the circuit breaker or contactor and the degree of magnetization, switch-off delays may occur as a result in an order of magnitude that exceeds the tolerance range of the circuit breaker or contactor. The circuit breaker or contactor then no longer operates within its specification or the assured characteristics.

A passive solution would be to use an armature material with a better (lower) remanence. A material of this type is however considerably more expensive than in the case of conventionally used, very inexpensive iron.

SUMMARY OF THE INVENTION

On the basis of the known contactor, the object of the invention is to propose a switching arrangement that enables particularly fast switch-off times.

The invention achieves this object by means of a switching arrangement as claimed.

A solenoid actuator is a conventional design in e.g. medium-voltage installations for switching devices in which a magnetic field is generated by one or more live coils, which magnetic field attracts a different ferromagnetic metal piece, e.g. a metal plate which is termed an armature plate. This attraction causes a movement which is transmitted to a movable contact in the switching device and presses same onto the fixed contact. Typically, two coils are used, which can be wired in parallel or in series. This has the advantage that the magnetic force can be kept approximately equal, even if, as mentioned in the introduction, the input voltage for the coils turns out to be different due to different nominal voltages of the electricity supply in different countries or for different use cases. The two coils of the solenoid actuator in the on-state exert an attractive force on the magnet armature. The transmission mechanism converts the movement of the magnet armature into a movement of the movable contact toward the fixed contact and for this has e.g. a toggle lever. The solenoid actuator has controllable switching devices for the coils.

A vacuum switching device in the meaning of the invention has e.g. a fluid-tight housing, in the interior of which a vacuum prevails (or an extremely low gas pressure below 0.1% atmospheric pressure). If a movable contact is pulled away from a fixed contact fast e.g. by means of a spring force, then a resultant electric arc is rapidly extinguished, because among other things there is barely any ionizable medium for a current flow. Vacuum switching devices are particularly well suited for switching alternating current, because an electric arc always breaks when the voltage crosses zero.

Hitherto there has not been a solution that actively counteracts the problem of magnetization of the armature plate or even the entire ferromagnetic circuit, that is to say e.g. also the iron yoke of the coil(s). The delays that occur when switching off are either accepted by the manufacturer or already taken into consideration in advance in the tolerances of the specification. The latter has the disadvantage that a comparatively large range for the switch-off delay must be specified in the datasheet or the specification, which is somewhat unacceptable for the time-critical applications of customers.

The invention is based on the approach of reversing the coil current or reversing the polarity of the coil current either for each switching action or cyclically (depending on the control electronics that are used). The polarity of the "north-south" orientation of the magnetic field in the ferromagnetic circuit (magnet armature and iron yoke of the coil(s)) is then reversed accordingly, so that no magnetization takes place. If the armature plate is not magnetized or only very slightly magnetized, during the switching off of the coil current there is no more magnetic force to delay the switching off.

In a preferred embodiment of the switching arrangement according to the invention, the polarity-reversing device has controllable switching devices for the at least one coil.

In a further preferred embodiment of the switching arrangement according to the invention, the controllable switching devices have at least one of the following switching devices: MOSFET, IGBT, relay. A MOSFET is a metal oxide semiconductor field effect transistor and an IGBT is a bipolar transistor with an insulated-gate electrode. A relay is a remotely actuated switch that is operated by electric current and generally has two switch positions. The relay is activated by means of a control circuit and can switch further circuits.

In a further preferred embodiment of the switching arrangement according to the invention, a first actuation device is designed to actuate the controllable switching devices in such a manner during each switch-on of the at least one coil that the polarity of the current flow is reversed. In this case, the magnetic coils are actuated either by an electronic or a mechanical switch (e.g. a relay). A correspondingly designed electronic circuit or other auxiliary device (e.g. bistable relay) ensures that the polarity of the coil current changes during every actuation.

An actuation device has e.g. an electronic circuit or a data processor. A microcontroller may be used for example.

In this embodiment, which focuses on the switch-on operation of the switching arrangement, it is typically assumed that the phases in which the contactor is switched on are, on statistical average, of approximately equal length for each polarity (i.e. for each current direction in the coil).

It is additionally assumed that each individual switch-on phase is short enough to allow no significant magnetization of the armature plate. In the context of the invention, the term switch-on phase refers not to the time period that the contactor requires for the change of state from OFF to ON, but rather to the total time in which the contactor is in the state ON. For 1000 switching cycles over the operating life of the switching arrangement 1, there would therefore be approximately 1000 polarity reversals.

In a further preferred embodiment of the switching arrangement according to the invention, the first actuation device has a bistable relay. A bistable relay is for example known from the website "Relais-Tipp-Ein-und Zweispulen-Varianten von bistabilen Relais Ansteuern" [Relay tip-Actuating single and double coil variants of bistable relays] of Dr. Dietmar Tschierse et al. (link: https://www.elektronikpraxis.vogel.de/ein-und-zweispulen-varianten-von-bistabilen-relais-ansteuern-a-446696/).

In a further preferred embodiment of the switching arrangement according to the invention, the controllable switching devices are arranged in the polarity-reversal device in the manner of a H-bridge relative to the at least one coil. A H-bridge, which is also termed a bridge circuit, is e.g. commonly used to reverse the direction of rotation of an electric motor of a machine or a vehicle. This is explained for example on the website "H-Brücke-Die Andersherum-Schaltung" [H-bridge—the back-to-front circuit] (link: http://dieelektronikerseite.de/Lections/H-Bruecke % 20-%20Die %20Andersherum-Schaltung.htm).

In a further preferred embodiment of the switching arrangement according to the invention, a second actuation device is designed to actuate the controllable switching devices of the at least one coil in such a manner that the polarity of the current flow is reversed multiple times. The advantage of this method lies in it being possible to carry out the demagnetization independently of the length of the switch-on phase or a renewed switching action.

The demagnetization takes place during the switch-on phase in this case. To this end, the polarity of the coil current is reversed in rapid succession.

This approach of multiple polarity reversal during holding operation, i.e. with contacts closed and the magnet armature attracted by the coils, for example requires a temporary (e.g. mechanical) locking of the contact pressure of the contacts, as the contactor otherwise opens in an undesired manner when the magnetization crosses zero and the underlying power supply system is de-energized. In practice, the contactor is locked e.g. for the entire duration of the on-state.

In a further preferred embodiment of the switching arrangement according to the invention, the second actuation device is designed to provide a current pulse for each polarity-reversal process by means of pulse width modulation, in order to generate a magnetic field, which fades away with time, in the at least one coil. This is an advantage because demagnetization of the magnet armature can be achieved in each case by means of the fading magnetic field.

In a further preferred embodiment of the switching arrangement according to the invention, the second actuation device is designed to set a current intensity and a time duration of the current pulses in such a manner that the attractive force on the magnet armature is sufficient to press the movable contact onto the fixed contact. This is an advantage because the switching arrangement or the contactor also remains securely closed during the regular demagnetization.

In a further preferred embodiment of the switching arrangement according to the invention, the second actuation device is designed to carry out a polarity reversal of the at least one coil regularly.

In a further preferred embodiment of the switching arrangement according to the invention, the second actuation device is designed to carry out a polarity reversal of the at least one coil at least once per day. This method can be repeated as often as desired or as required. Preferably, the polarity reversal is carried out at least once a month, even more preferably at least once a year. Even dependence on the number of switching actions of the switching arrangement carried out makes sense. For example, the polarity reversal can be carried out every 10 and preferably every 100 switching actions.

In a further preferred embodiment of the switching arrangement according to the invention, a third actuation device is designed to determine, on the basis of a magnetic model, whether a magnetization of a ferromagnetic circuit exceeds a previously determined magnetization limit value and to reverse the polarity of the current flow in the event of the magnetization limit value being exceeded. A magnetic model takes account for example of one or more of the following aspects: current intensity, polarity of the current, time duration of current supply, magnetic characteristics of the ferromagnetic circuit used, and geometric design of the ferromagnetic circuit. By means of the model, it is possible to choose automatically the time from which the next switching operation of the contactor is carried out with a changed polarity when the magnetization limit value is exceeded. The term ferromagnetic circuit in the meaning of the invention denotes at least the magnet armature and an iron yoke of the coil(s), but may also include further magnetizable components.

On the basis of the known contactor, the object of the invention is to propose a method for operating a switching arrangement, which enables particularly fast switch-off times.

The invention achieves this object by means of a method as claimed. Preferred embodiments of the method according to the invention are explained in dependent claims. These analogously give the same advantages as explained in the introduction for the switching arrangement according to the invention.

BRIEF DESCRIPTION OF THE DRAWING

To better explain the invention, the FIGURE shows an exemplary embodiment of a switching arrangement 1 according to the invention in a schematic illustration.

DETAILED DESCRIPTION OF THE INVENTION

The switching arrangement 1 has a vacuum switching device 8-14 having a housing 14 which is fluid-tight and evacuated 13. In the interior of the housing 14, a movable contact 11 is pressed against a fixed contact 12. Thus, the closed state of the switch with switched-on solenoid actuator 2, 4 is illustrated. A switching bar 8 is connected to the movable contact 11 through the housing 14, wherein e.g. bellows, which are not illustrated, ensure the movability. For mechanically disconnecting the contacts 11, 12, a spring device 10 is provided, which is supported on a support plate 9 and is prestressed in the illustrated closed state.

The switching bar 8 is connected to a toggle lever 5-7, wherein the first leg 6 and the second leg 5 are connected in an angularly rigid manner, but are mounted in a rotatable manner about the articulation 7. The second leg 5 is connected to an armature plate 4 made from metal, e.g. iron. This transmission mechanism 5-7 converts a movement of the magnet armature 4 into a movement of the movable contact 11 toward the fixed contact 12.

The solenoid actuator 2, 4 has at least one coil 2 which is connected to a polarity-reversal device 15 by means of connecting lines 20, 21. The polarity-reversal device 15 has four controllable switching devices 31-34, e.g. IGBTs, for the at least one coil 2. The switching devices 31-34 are wired as a H-bridge, i.e. a connecting line 20 is connected between two switching devices 31, 32 in a first branch 17, while the other connecting line 21 is connected between two switching devices 33, 32 in a second branch 23 of the circuit. Both branches 17, 23 are connected by lines 19. A direct current source 16 is connected using lines 18.

Two switching devices 31, 34 are closed in the on-state that is illustrated. The coil 2 exerts an attractive force F on the magnet armature 4 and moves same toward the coil 2. If the two switching devices 31, 34 are opened and the other two switching devices 32, 33 are closed, then the polarity of the coil is reversed.

The polarity-reversal device 15 is designed to reverse the polarity of a current flow through the at least one coil at least once per day.

A second actuation device 35 is connected to the polarity-reversal device 15 in order to actuate the controllable switching devices 31-34 of the at least one coil 2 in such a manner that the polarity of the current flow is reversed multiple times.

In this case, a current pulse is provided for each polarity-reversal process by means of pulse width modulation, in order to generate a magnetic field, which fades away with time, in the at least one coil. Polarity reversals can be carried out many dozens or hundreds of times, in order to demagnetize the magnet armature to the greatest extent possible. In this manner, it is ensured that the switch-off times are not unnecessarily extended by magnetization of the armature. It is preferred to set the current intensity and the time duration of the current pulses in such a manner that the attractive force F on the magnet armature 4 is sufficient to press the movable contact 11 onto the fixed contact 12. As a result, the switching arrangement 1 is even kept securely in the closed state in the case of regular polarity reversals of the current supply of the coils.

The invention claimed is:

1. A switching arrangement, comprising:

a vacuum switch having a movable contact and a fixed contact;

a solenoid actuator having at least one coil and a magnet armature, said at least one coil being configured, in an on-state thereof, to exert an attractive force on said magnet armature and to move said magnet armature;

a transmission mechanism configured to convert a movement of said magnet armature into a movement of said movable contact toward said fixed contact; and a polarity-reversal device configured to reverse a polarity of a current flow through said at least one coil, said polarity-reversal device comprising controllable switches for said at least one coil; and a first actuation device configured to actuate said controllable switches to reverse the polarity of the current flow during each switch-on of said at least one coil, said first actuation device comprising a bistable relay.

2. The switching arrangement according to claim 1, wherein said controllable switches have at least one switch selected from the group consisting of MOSFET, IGBT, and relay.

3. The switching arrangement according to claim 1, wherein said controllable switches are connected in said polarity-reversal device in an H-bridge arrangement relative to said at least one coil.

4. The switching arrangement according to claim 3, further comprising a second actuation device configured to actuate said controllable switches of said at least one coil to reverse the polarity of the current flow multiple times.

5. The switching arrangement according to claim 4, wherein said second actuation device is configured to provide a current pulse for each polarity-reversal process by pulse width modulation, to generate a magnetic field in said at least one coil which fades away with time.

6. The switching arrangement according to claim 5, wherein said second actuation device is configured to set a current intensity and a time duration of the current pulses to generate the attractive force on the magnet armature sufficient to press said movable contact onto said fixed contact.

7. The switching arrangement according to claim 4, wherein said second actuation device is configured to carry out a polarity reversal of said at least one coil at regular intervals.

8. The switching arrangement according to claim 7, wherein said second actuation device is configured to carry out the polarity reversal of said at least one coil at least once per day.

9. A method for operating a switching arrangement, the method comprising:

providing a vacuum switching device having a movable contact and a fixed contact;

providing a solenoid actuator having at least one coil which is configured, in an on-state, to exert an attractive force on, and move, a magnet armature;

transmitting a movement of the magnet armature into a movement of the movable contact toward the fixed contact by way of a transmission mechanism; and reversing a polarity of a current flow through the at least one coil by a polarity-reversal device having controllable switches for the at least one coil; and providing an actuation device with a bistable relay, and actuating the controllable switches by the actuation device configured to actuate the controllable switches to reverse the polarity of the current flow during each switch-on of the at least one coil.

10. The method according to claim 9, wherein the switches for the at least one coil are controllable switches in the polarity-reversal device connected in an H-bridge relative to the at least one coil.

11. The method according to claim 10, which comprises actuating the controllable switches of the at least one coil by a further actuation device to reverse the polarity of the current flow multiple times.

* * * * *